I. W. STILES.
Rack for Supporting Articles Over Lamps for Heating.
No. 215,180. Patented May 6, 1879.
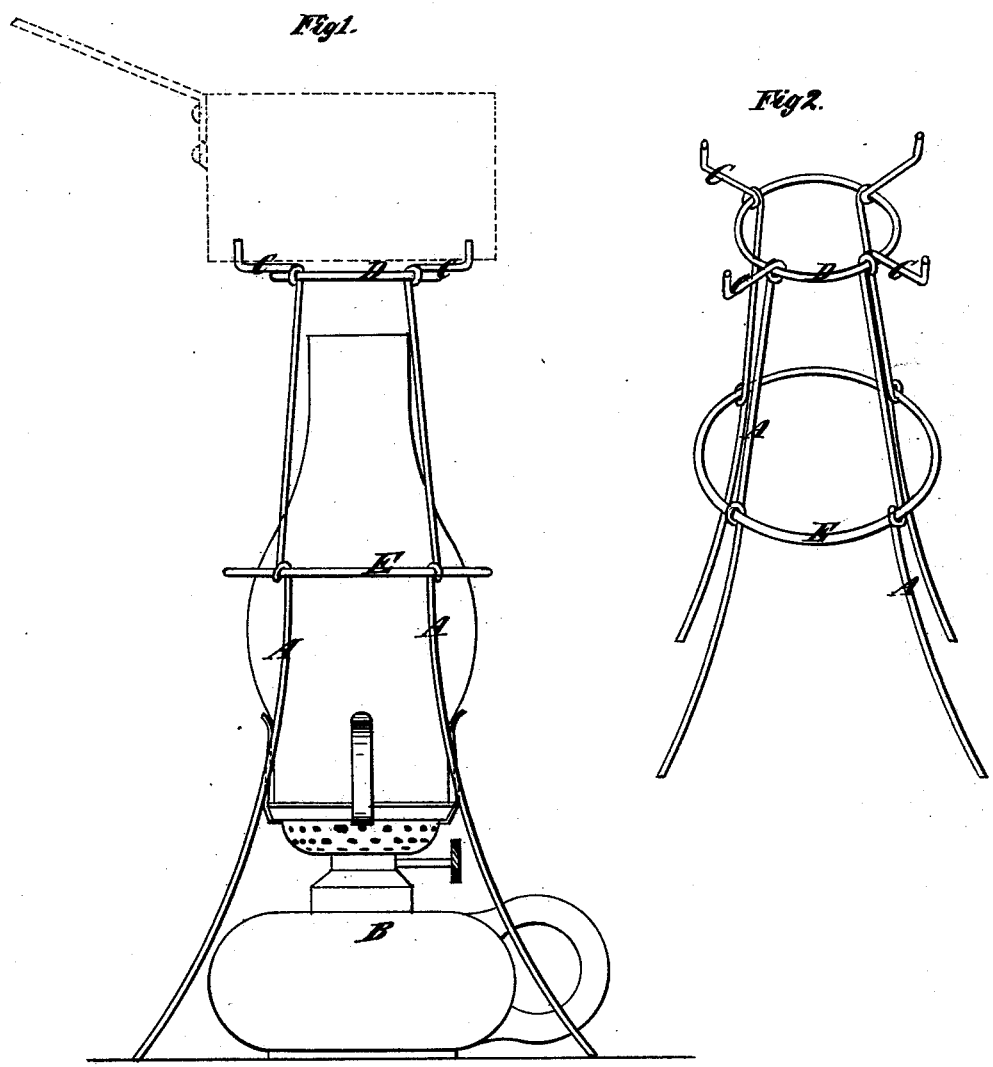

UNITED STATES PATENT OFFICE.

ISAAC W. STILES, OF NORTH HAVEN, CONNECTICUT.

IMPROVEMENT IN RACKS FOR SUPPORTING ARTICLES OVER LAMPS FOR HEATING.

Specification forming part of Letters Patent No. 215,180, dated May 6, 1879; application filed January 21, 1879.

*To all whom it may concern:*

Be it known that I, ISAAC W. STILES, of North Haven, in the county of New Haven and State of Connecticut, have invented a new and Improved Rack for Use in Supporting Articles over Lamps for Heating, of which the following is a specification.

The object of this invention is to afford a simple, cheap, and convenient device whereby an article may be supported over a lamp, such as is ordinarily used for illuminating purposes, so that the contents may be readily heated.

To this end the invention consists in a rack comprising a number of wire legs or standards, bent laterally at the top, so as to form arms, constituting a holder susceptible of supporting an article such as a cup, sauce-pan, or other vessel, and connected by a brace or ring, the whole being of such size as to fit over an ordinary illuminating-lamp and its chimney, and the lower portions of its legs or standards being capable of being bent at pleasure, so as to raise or lower the arms or holder suitably to support the article to be heated in convenient relation to the top of the chimney of the lamp.

In the accompanying drawings, Figure 1 is a side view of a rack embodying my invention applied to an ordinary illuminating-lamp, and Fig. 2 is a perspective view of such rack.

Similar letters of reference designate corresponding parts in both figures.

A designates legs or standards, (in the present instance four in number,) made of wire, spread apart at the base, to afford them stability and accommodate between them the reservoir or fount of an ordinary illuminating-lamp, B, and located sufficiently near to one another at the upper portion to occupy positions close to the chimney of the lamp. At the upper end they are bent laterally outward to form arms C, constituting a holder for an article—for instance, a cup, sauce-pan, or other vessel—to be heated by the lamp. These arms are preferably bent upward at or near the outer end, to retain the article supported by them from slipping off sidewise. These legs or standards are connected at or near their lateral extension by a ring, D, and some distance below the same by another ring, E. These rings are shown as made of wire, and, as represented, the legs or standards are connected to them by being bent or wound around them. Below the ring E the legs or standards may be bent inward or outward, to raise or lower the arms C or holder relatively to the apex or top of the lamp-chimney, so as to provide for adjusting the article to be heated in proper relation thereto, and thereby provide for the best results.

The rack thus formed is simple, light, convenient, and so cheap as to be within the means of even the poorest classes.

The inconvenience attending the heating of infants' and invalids' food may be avoided by the use of one in connection with an ordinary kerosene-lamp, not only with as good results as those attainable with the more costly apparatus heretofore designed for that purpose, but with far greater convenience.

What I claim as my invention, and desire to secure by Letters Patent, is—

1. A rack for use in supporting over a lamp articles to be heated thereby, and consisting of pliable wire legs or standards connected by rings, and bent to form a holder for the articles, substantially as specified.

2. A rack for use in supporting over a lamp articles to be heated thereby, and consisting of pliable wire legs or standards bent laterally near the top to form arms, leaving upturned ends, so as to constitute a holder, and connected by rings, around which they (the said legs or standards) are bent or wound, substantially as specified.

ISAAC W. STILES.

Witnesses:
W. D. WARREN,
HENRY E. PARDER.